United States Patent [19]
Togashi et al.

[11] Patent Number: 5,908,882
[45] Date of Patent: Jun. 1, 1999

[54] EPOXY RESIN COMPOSITION

[75] Inventors: Eiki Togashi; Youhei Suzuki, both of Chiba, Japan

[73] Assignee: Mitsui Chemicals, Inc., Tokyo, Japan

[21] Appl. No.: 08/940,376

[22] Filed: Sep. 30, 1997

[30] Foreign Application Priority Data

Oct. 8, 1996 [JP] Japan .................................. 8-267289

[51] Int. Cl.$^6$ ...................................................... C08L 63/02
[52] U.S. Cl. ........................................... 523/443; 523/466
[58] Field of Search ...................................... 523/443, 466

[56] References Cited

U.S. PATENT DOCUMENTS 5,064,881  11/1991  Togashi et al. ......................... 523/443

FOREIGN PATENT DOCUMENTS 329259  4/1991  Japan .

*Primary Examiner*—Robert Dawson
*Assistant Examiner*—D. Aylward
*Attorney, Agent, or Firm*—Birch, Stewart, Kolasch & Birch, LLP

[57] ABSTRACT

Disclosed is an epoxy resin composition which is excellent in thermal stability without being cured in a cylinder of an injection molding machine and is extremely suppressed in the formation of flux on molding.

This epoxy resin composition has an important feature residing in the use of a specific silica of the following characteristics as an inorganic filler to be incorporated thereinto whereby excellent technical effects can be achieved such as the composition being injection-moldable and the formation of flux on molding being suppressed extremely:

(a) an average particle diameter of not more than 30 $\mu$m,
(b) 5–30% by weight of a molten or crystalline silica powder having an average particle diameter of not more than 7 $\mu$m and a specific surface area of at least 5 m$^2$/g in the total silica content,
(c) 15–45% by weight of silica having an average particle diameter of not more than 5 $\mu$m in the total silica content,
(d) the maximum particle diameter of the total silica content of not more than 150 $\mu$m, and
(e) a silica content of 70–82% by weight in the total composition.

An alkylurea derivative is preferably used as the curing accelerator among which dimethylamine adduct of 2,4-tolylene diisocyanate is more preferably used.

4 Claims, 2 Drawing Sheets

5,908,882

EPOXY RESIN COMPOSITION

BACKGROUND OF THE INVENTION

1. Field of the Invention

The present invention relates to an epoxy resin composition, and more particularly, to an injection-moldable epoxy resin composition which is excellent in thermal stability without being cured in a cylinder of an injection-molding machine and is extremely suppressed in the formation of flux on molding.

2. Description of the Related Art

It is well known that epoxy resins are excellent in various physical properties such as heat-resisting property, chemicals-resisting property and insulating property and are employed for various uses.

From the past, a transfer molding method is known as a means for molding epoxy resin materials which is appropriate in the aspect of productivity. In transfer molding, it is ordinary that an epoxy resin composition is cast in a pot of a metal mold prior to molding and the composition is then pressed by a plunger and cured under fluidization within the metal mold.

In this molding method, however, a material for molding has initially to be shaped into tablets and a preheating step is needed so that shortening of the molding cycle becomes naturally limitative, thus making producibility and economization of cost difficult to be attained. In transfer molding, moreover, there remains such a problem in the course of molding that a cull part remaining in the pot in addition to a runner part becomes a waste portion after curing.

The cured cull part is normally discarded as a waste without being recycled, but the waste is not decomposed by biodegradation and thus causes an environmental pollution.

In an injection-molding method, on the other hand, a thermoplastic resin powder for molding is only charged into a hopper whereby the subsequent preheating and weighing operations of the powder are automatically operated in a cylinder and the fluidized resin is injected into a metal mold where curing of the resin is effected. In this case, therefore, steps for shaping the molding material into tablets and preheating them are not required and furthermore a continuous production of the moldings becomes possible, thus making shortening of the molding cycle possible as compared with the transfer molding operation. The injection-molding method can thus be said to be superior in the aspect of production efficiency.

However, epoxy resin molding materials employed heretofore in transfer molding are inferior in thermal stability in the cylinder so that melt viscosity of the materials increases extremely to make injection-molding impossible.

SUMMARY OF THE INVENTION

As a result of acknowledging problems encountered in the prior art and seeking ways to solving the problems, it had been found that an epoxy resin composition showing a specific melt viscosity at a specific gel time and a specific temperature was excellent in thermal stability in a cylinder and had a curing characteristics capable of being cured rapidly in a metal mold, and a patent application on the basis of this finding was filed as Japanese Patent Appln. No. Hei. 8-20031.

In addition to the above injection-moldable characteristics, inhibition of the formation of flux on molding becomes an important technical problem among the important applications of epoxy resin compositions for sealing up semi-conductors. As a result of further study having been made continuously for searching epoxy resin compositions adaptable in this aspect, it has now been found surprisingly that when an epoxy resin compositon is incorporated with a very specific silica as an inorganic filler to be added to the composition, it is still injection-moldable and moreover extremely effective for inhibiting the formation of flux on molding. The present invention has been accomplished on the basis of this finding.

In epoxy resin compositions for sealing up semi-conductors, a technical art for minimizing the formation of flux on molding is disclosed in Japanese Patent Publn. No. Hei. 3-29259 wherein the invention is featured by incorporating the composition with a specific quarts filler.

However, the epoxy resin composition in this prior art contemplates molding according to the conventional transfer molding method and is not suited for injection-molding to which the present invention aims. Further, the formation of flux is inhibited in this prior art only to a little degree and a substantial difference from the conventional art is not found in case of a spiral flow.

The present invention has been proposed for achieving the aforesaid object, standing on acknowledging such known conventional art, and the gist thereof resides in the use of a specific powdery silica composition as inorganic filler to be incorporated into the epoxy resin composition.

BRIEF DESCRIPTION OF THE DRAWINGS

The present invention will now become fully understood from the detailed description given hereinbelow and the accompanying drawings which are given by way of illustration only and wherein.

Figure 1:
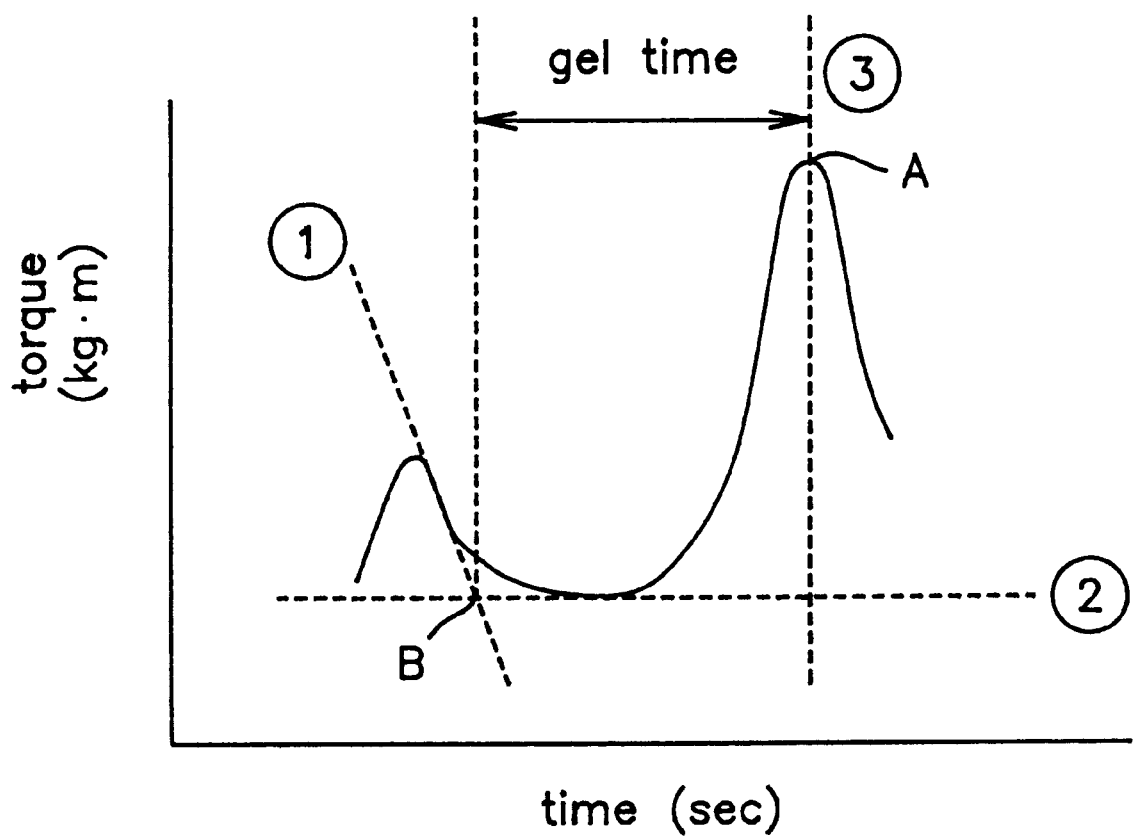
FIG. 1 is an explanatory drawing on the measuring method of gel time in the present invention.

In the drawing, lines are drawn respectively at a given temperature (100° C. or 180° C.) to a region showing depression of torque after addition of a sample (tangential line 1), a region keeping the minimum torque (tangential line 2) and the maximum torque point A (perpendicular line 3). A length from a point of intersection between the tangential line 1 and the tangential line 2 to the perpendicular line 3 was then measured to define the gel time.

Figure 2:
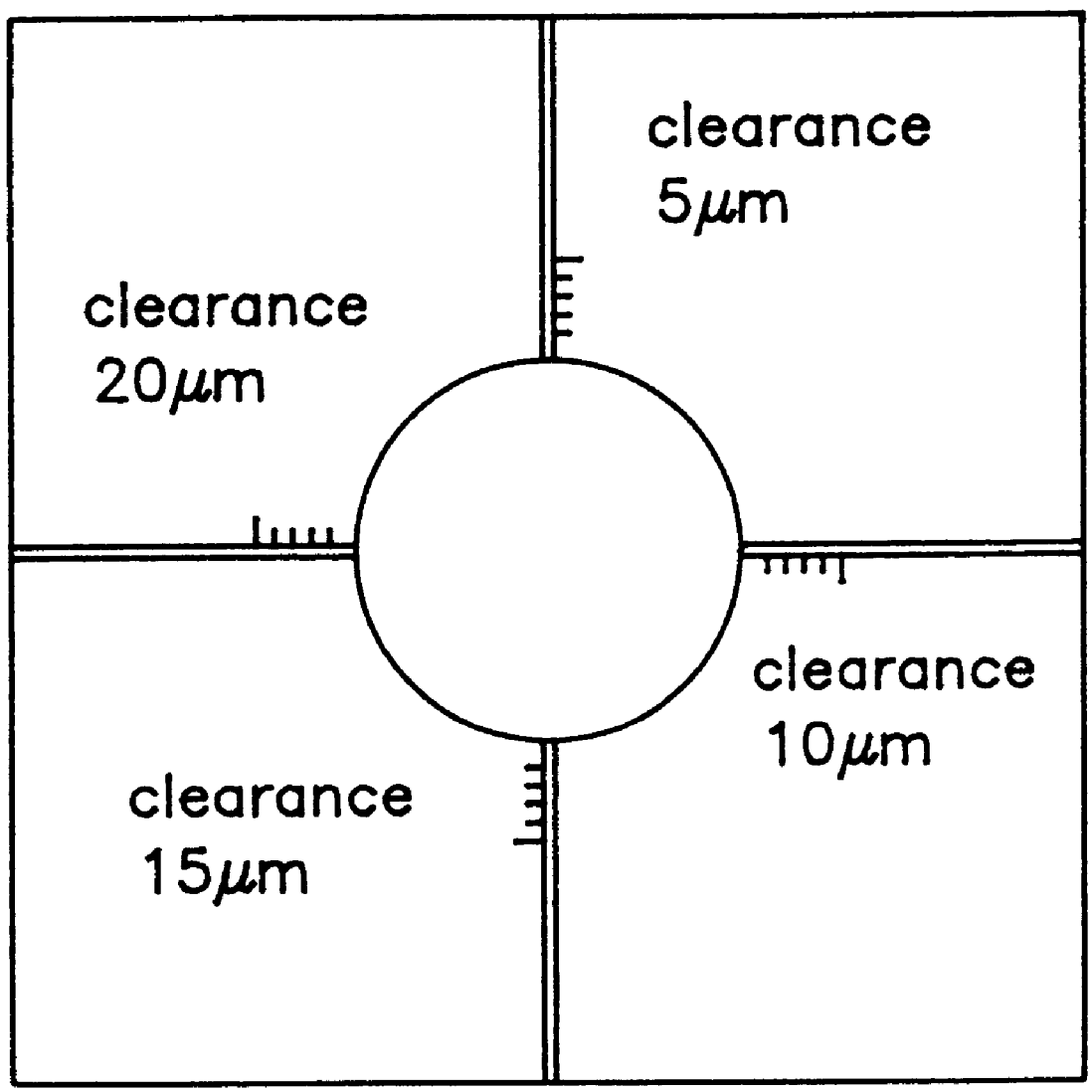

FIG. 2 is an explanatory drawing on the measuring method for length of flux in the present invention.

The length of molding flux is defined by a length (mm) measured by a measuring metal mold having a clearance of 5 μm to 20 μm by an interval of 5 μm in the rectangular 4 directions.

DETAILED DESCRIPTION OF THE INVENTION

In accordance with the present invention, there is provided an epoxy resin composition comprised of (1) an epoxy resin, (2) a curing agent, (3) a curing accelerator and (4) a silica powder, characterized in that the silica powder has (a) an average particle diameter of not more than 30 μm, (b) 5–30% by weight of a molten or crystalline silica powder having an average particle diameter of not more than 7 μm and a specific surface area of at least 5 m$^2$/g in the total silica content, (c) 15–45% by weight of silica having an average particle diameter of not more than 5 μm in the total silica content, (d) the maximum particle diameter of the total silica content of not more than 150 μm, and (e) a silica content of 70–82% by weight in the total composition.

In accordance with the present invention, there is also provided the aforesaid epoxy resin composition wherein the curing accelerator is a urea derivative of the general formula: Ar—NH—CO—NR$_2$ where Ar stands for a substituted or unsubstituted aryl group and R's may be the same or different and each stands for an alkyl group.

In accordance with the present invention, there is further provided the aforesaid epoxy resin composition wherein the curing accelerator is an alkylurea derivative of the following general formulas (a)–(f):

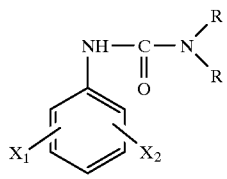
(a)

wherein $X_1$ and $X_2$ may be the same or different and each stands for a hydrogen atom, a halogen atom, an alkyl group preferably with 1–5 carbon atoms, an alkoxy group preferably with 1–5 carbon atoms or a nitro group, and R's may be the same or different and each stands for an alkyl group preferably with 1–10 carbon atoms and more preferably with 1–5 carbon atoms.

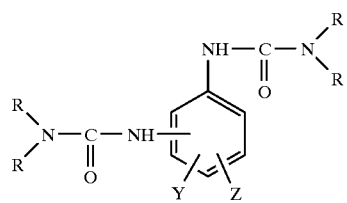
(b)

wherein Y and Z may be the same or different and each stands for a hydrogen atom, a halogen atom or an alkyl group preferably with 1–5 carbon atoms and R's may be the same or different and each stands for a lower alkyl group.

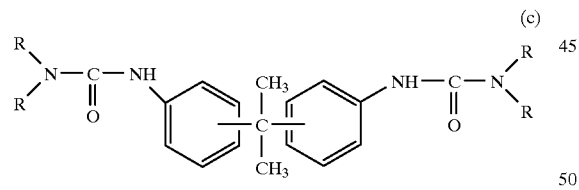
(c)

wherein R's may be the same or different and each stands for a lower alkyl group;

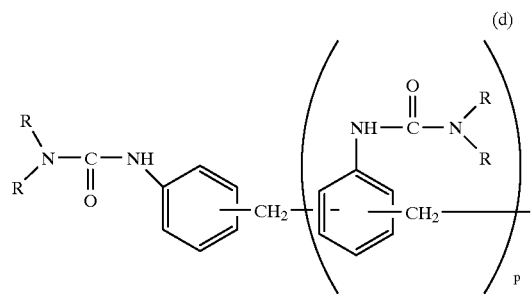
(d)

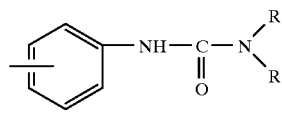

wherein P is an integer of 0–5 and R's may be the same or different and each stands for an alkyl group preferably with 1–10, more preferably with 1–5 carbon atoms.

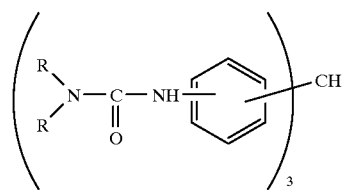
(e)

and

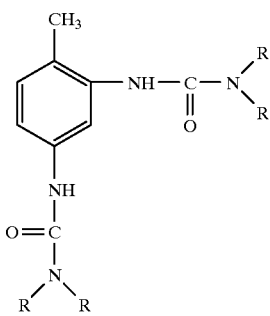
(f)

wherein R's may be the same or different and each stands for an alkyl group preferably with 1–10, more preferably with 1–5 carbon atoms.

In accordance with the present invention, there is still further provided the aforesaid epoxy resin composition wherein the curing accelerator is a dimethylamine adduct of 2,4-tolylenediisocyanate of the following formula:

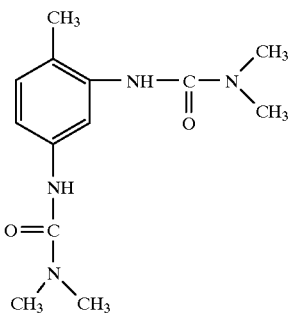

PREFERABLE EMBODIMENTS OF THE INVENTION

The epoxy resin composition of the present invention is, as mentioned above, comprised of an epoxy resin, a curing agent, a curing accelerator, and a silica powder and has an important character in that the silica powder has (a) an average particle diameter of not more than 30 μm, (b) 5–30% by weight of a molten or crystalline silica powder having an average particle diameter of not more than 7 μm and a specific surface area of at least 5 m$^2$/g in the total silica content, (c) 15–45% by weight of silica having an average particle diameter of not more than 5 μm in the total silica content, (d) the maximum particle diameter of the total silica content of not more than 150 μm, and (e) a silica content of 70–82% by weight in the total composition.

Epoxy Resin

No limitation exists in the epoxy resin utilizable for the present invention so far as it carries at least two epoxy groups in the molecule. Illustrative of the epoxy resin are, for example, an epoxy resin of bis-phenol A type, an epoxy resin of cresol novolac type, a halogenated epoxy resin, a naphthalene type epoxy resin, among which epoxy resins having an epoxy equivalent of not more than 300 such as those of cresol novolac type or biphenyl type are preferably used for sealing electronic parts from the viewpoint of heat-resisting property and moisture-resisting property. It is possible to use at least two kinds of epoxy resins.

In the composition, a proportion of the epoxy resin is preferably 5–30% by weight, more preferably 5–20% by weight. If the proportion of the epoxy resin is less than 5% by weight, moldability and binding property will become insufficient, and contrary to this, if the proportion exceeds 30% by weight, a line expansion coefficient will tend to become undesirably larger.

Curing Agent

In general, no particular limitation exists in the curing agent so far as it causes a curing reaction with the epoxy resin. Illustrative of the curing agent are, for example, a novolac resin such as a phenol novolac resin or a cresol novolac resin, and a bis-phenol compound such as bis-phenol A, among which a novolac resin having a softening point of 60°–110° C. and a phenol equivalent of 100–150 is preferably used from the viewpoint of heat-resisting property and moisture-resisting property.

The proportion of the curing agent is preferably 20–60 parts by weight, more preferably 40–55 parts by weight per 100 parts of the epoxy resin. A stoichiometrical ratio of the curing agent to the epoxy resin is preferably within the range of 0.5 to 1.5, especially 0.7 to 1.3 in view of moisture-resisting property and mechanical characteristics.

Curing Accelerator

A latent-type curing accelerator is used for promoting the cross-linking reaction between the epoxy resin and the curing agent and for imparting injection-moldable thermal stability to the epoxy resin composition.

Illustrative of the curing accelerator are, for example, DBU derivatives such as 1,8-diazacyclo[5.4.0]undecene-7-phenol salt, phenol novolac salt and carbonate, dicyanodiamide and a urea derivative of the formula: Ar—NH—CO—NR$_2$ wherein Ar stands for a substituted or unsubstituted aryl group and R's may be the same or different and each stands for an alkyl group. Among these curing accelerators, the use of the aforesaid urea derivative is preferable for obtaining the injection-moldable epoxy resin composition of the present invention possessing excellent physical properties.

The use of alkylurea derivatives of the following general formulas (a)–f) as the curing accelerator can improve stability at about 100° C. and, as a result, thermal stability of the resin in the cylinder of an injection-molding machine is enhanced.

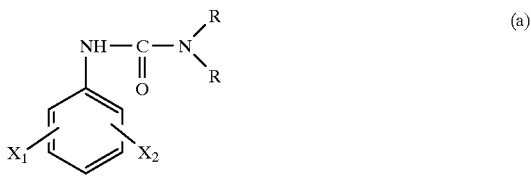

wherein $X_1$ and $X_2$ may be the same or different and each stand for a hydrogen atom, a halogen atom, an alkyl group, preferably a lower alkyl group with 1–5 carbon atoms, an alkoxy group or a nitro group, two R's may be the same or different and each stand for an alkyl group, preferably an alkyl group with 1–10 carbon atoms, more preferably a lower alkyl group with 1–5 carbon atoms.

Illustrative of compounds corresponding to the formula (a) are, for example, 3-phenyl-1,1-dimethylurea, 3-(p-chlorophenyl)-1,1-dimethylurea, 3-(3,4-dichlorophenyl)-1,1-dimethylurea, 3-(o-methylphenyl)-1,1-dimethylurea, 3-(p-methylphenyl)-1,1-dimethylurea, 3-(methoxyphenyl)-1,1-dimethylurea, and 3-(nitrophenyl)- 1,1-dimethylurea.

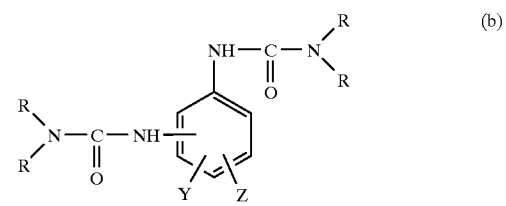

wherein Y and Z may be the same or different and each stand for a hydrogen atom, a halogen atom or an alkyl group, preferably a lower alkyl group with 1–5 carbon atoms and two R's may be the same or different and each stand for a lower alkyl group with 1–10 carbon atoms (preferably 1–5 carbon atoms).

Illustrative of compounds corresponding to the formula (b) are, for example, 1,1'-phenylene-bis-(3,3-dimethylurea) and 1,1'-(4-methyl-m-phenylene)-bis-(3,3-dimethylurea).

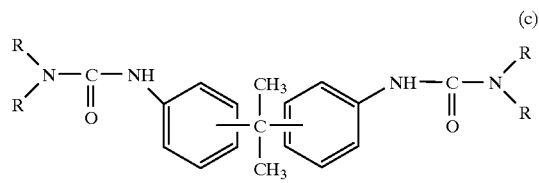

wherein R's may be the same or different and each stand for a lower alkyl group.

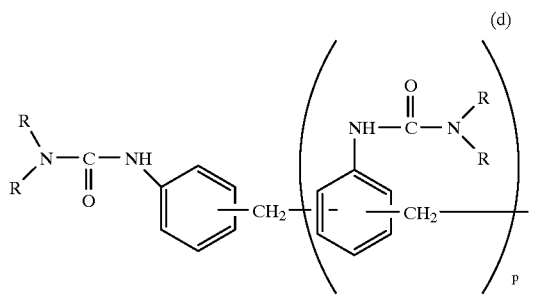

-continued

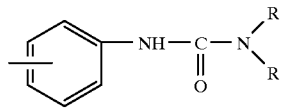

wherein p is an integer of 0 to 5 and R's may be the same or different and each stand for an alkyl group, preferably an alkyl group with 1–10 carbon atoms, more preferably an alkyl group with 1–5 carbon atoms.

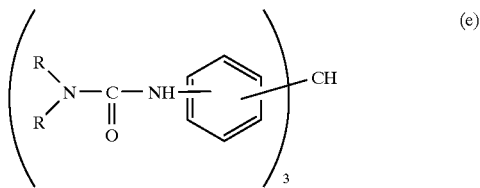

and

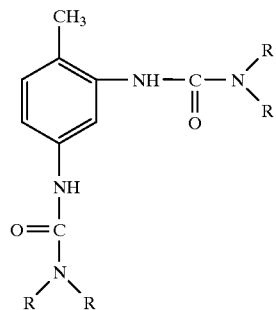

wherein R's may be the same or different and each stand for an alkyl group, preferably an alkyl group with 1–10 carbon atoms, more preferably an alkyl group with 1–5 carbon atoms.

In the above general formulas (a)–(f), preferable examples of the alkyl group or alkoxy group represented by $X_1$, $X_2$ and R include methyl group, ethyl group, propyl group and butyl group and the corresponding alkoxy groups. As a compound corresponding to the formula (f) is exemplified a dimethylamine adduct of 2,4-tolylene diisocyanate of the following formula:

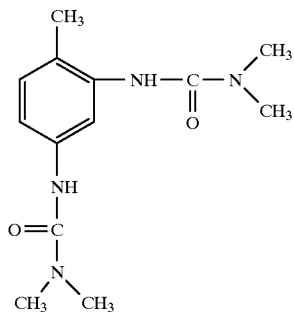

Above all, the dimethylamine adduct is preferably used as it shows significantly improved stability at around 100° C. and curing characteristics adequate for injection-molding of the present invention. These curing accelerators are incorporated into the epoxy resin in an amount of 3–20 parts by weight, preferably 5–10 parts by weight per 100 parts by weight of the epoxy resin.

With a view to increasing molding cycle and decreasing the amount of flux generated, conjoiont use of an imidazole such as 2-methylimidazole, 2-ethyl-4-methylimidazole or 2-heptadecylimidazole, or an organophosphine such as triphenyl-phosphine or tri-(p-methylphenyl)phosphine is preferable unless the latent-type curing characteristics be damaged.

Silica Powder

In the present invention, it is one of the important features to incorporate the epoxy resin composition with a specific silica powder defined below: (a) an average particle diameter of not more than 30 μm, (b) 5–30% by weight of a molten or crystalline silica powder having an average particle diameter of not more than 7 μm and a specific surface area of at least 5 $m^2/g$ in the total silica content, (c) 15–45% by weight of silica having an average particle diameter of not more than 5 μm in the total silica content, (d) the maximum particle diameter of the total silica content of not more than 150 μm, and (e) a silica content of 70–82% by weight in the total composition.

A correlation between the physical properties of the silica powder and the formation of flux on molding has been discovered for the first time by the present inventors as a result of repeated experiments. This fact will become apparent from Examples given hereinafter.

According to a result of the inventors' experiments, the silica powder capable of satisfying the above requisites can be compacted into the resin composition to such a degree that the generation of heat by friction in the composition wthin a cylnder can be suppressed while a screw is rotated. Consequently, redundant flow of the resin can be inhibited and the formation of flux on molding is supposed to decrease.

The silica powder in a finely divided form has a specific surface area of at least 5 $m^2/g$ and is contained in a proportion of 5–30% by weight in the total silica. The remaining silica powder has a specific surface area of not more than 60% of the finely divided silica powder so that the composition in the best compact state may be contemplated. Especially preferable is that the total silica has an average particle diameter of not more than 10 μm, the finely divided silica powder has a specific surface area of at least 10 $m^2/g$ and is contained in the proportion of 10–20% by weight in the total silica, and the remaining silica powder has a specific surface area of not more than 40% of the finely divided silica powder.

If the silica powder has a maximum particle size of at least 150 μm, it will tend to clog the mesh of a gate, thus causing a cylinder unloaded. On the other hand, if the content of the silica powder in the total resin composition becomes less than 70% by weight, the composition will tend to drop spontaneously from the tip of a nozzle, thus disturbing continuous moldability, espcially in case the molding operation is effected according to a vertical injecting-molding method. What is more, the composition becomes larger in line expansion coefficient so that cohesive power betwen a lead frame and electronic parts will be damaged, thus incurring deterioration of moisture-resisting property.

Alternatively, if the content of the silica powder in the total resin composition exceeds 82% by weight, the whole mixture will become poor in adhesion to rolls in case of roll kneading, thus making a continuous production of the resin composition difficult.

In case epoxy resin moldings are molded, a combination of silica powders having different specific suface areas is needed for charging the composition in best compact state.

If comparison is made with the same incorporated quantity, the volume of the silica powder occupying in the resin composition can be minimized by arranging a silica powder having a larger specific surface area in a gap of the arrangement of silica powder having a smaller specific surface area in comparison with the case of arranging a silica powder having one kind of specific surface area, so that generation of heat by friction in the cylinder may be suppressed.

In case of the finely divided silica powder alone having a specific surface area of at least 5 m²/g, on the other hand, it can be incorporated into the total composition only up to 55% by weight for securing continuous producibility. In such case, the line expansion characteristics and the continuous producibility are damaged.

Charging of the composition in best compact state becomes possible by conjoint use of a silica powder having a specific surface area of not more than 60% to this silica powder having the specific surface area.

If the specific surface area of the finely divided silica powder becomes less than 5 m²/g, the particle diameter of the remaining silica powder to be combined therewith will become larger, and as a result, a spiral flow value will be smaller. This spiral flow value is an important factor in the case of sealing electronic parts under low pressure so that a spiral value as low as 90 cm is at least required.

In case an average particle size of the total silica powder exceeds 30 μm, the content of the finely divided silica powder exceeds 30% by weight, and the proportion of the silica powder of not more than 5 μm exceeds 45% by weight, the spiral flow value will become smaller than the aforesaid 90 cm.

Furthermore, if the content of the finely divided silica powder is less than 5% by weight and if the content of silica powder having a particle diameter of not more than 5 μm is less than 15% by weight, the rate of forming flux on molding will be increased.

EXAMPLES

The present invention will now be illustrated in more detail by way of Examples and Comparative Examples, but it is to be construed that these Examples are given only for illustration and not intended to limit the scope of this invention.

Examples 1–6 and Comparative Examples 1–6

Characteristic properties of the silica powders employed in Examples and Comparative Examples are shown in Table 1.

Using the silica powder shown in Table 1 and following the recipe shown in Table 2, moldings were molded whereby (1) gel time at 100° C., (2) spiral flow value, (3) length of flux on molding (clearance of 5 μm), and (4) gel time at 180° C. were evaluated and also shown in Table 2.

The gel time referred to in Table 2 was measured according to the following method:

Measuring apparatus: Laboplastomill 20R200 Roller Mixer R-30 manufactured by KK Toyo Seiki Mfg. Works Amount of resin composition measured: 43 g Number of rotation of the rotar: 30 rpm The gel time was determined by reading out a gel time on the chart shown in FIG. 1. Under the conditions as above mentioned, lines are drawn respectively to a region showing depression of torque after addition of a sample (tangential line 1), a region keeping the minimum torque (tangential line 2) and the maximum torque point A (perpendicular line 3) at a given temperature (100° C. and 180° C.). Next, a length from a point of intersection between the tangential line 1 and the tangential line 2 to the perpendicular line 3 was measured to define the gel time.

The spiral flow value referred to in Table 2 was measured by using a spiral flow metal mold in accordance with EMMI 1-66. The temperature of the metal mold in this case was 150° C. while the injection pressure was 100 kg/cm².

By the term "Length of flux on molding" is meant herein a length (mm) measured by using a measuring metal mold as shown in FIG. 2 having a clearance of 5–20 μm by an interval of 5 μm in the rectangular 4 directions. An average value of the individual clearance values was determined as the length of flux.

TABLE 1

| Sort of silia | Aver*1 p.d.*2 of total silica (μm) | Finely divided silica | | | Silica jointly used with Finely divided silica | | | Content of silica (≦5 μm) in total silica (wt %) | Sort of silica |
|---|---|---|---|---|---|---|---|---|---|
| | | S.s.a.*3 (m²/g) | Aver p.d. (μm) | Content in total silica (wt %) | S.s.a. (m²/g) | Aver p.d. (μm) | Content in total silica (wt %) | | |
| A | 27 | 15.2 | 3.2 | 10 | 1.7 | 29.2 | 90 | 17 | M*4 |
| B | 8.2 | 15.2 | 3.2 | 20 | 3.0 | 13.5 | 80 | 37 | M/C*5 |
| C | 9.0 | 15.2 | 3.2 | 20 | 2.5 | 14 | 80 | 37 | M |
| D | 8.7 | 10.7 | 4.3 | 25 | 3.0 | 13.5 | 75 | 32 | M/C |
| E | 13.7 | 15.2 | 3.2 | 3 | 2.5 | 14 | 97 | 26 | M |
| F | 13.9 | 2.9 | 11.2 | 20 | 2.5 | 14 | 80 | 24 | M |
| G | 25 | 3.7 | 7.8 | 10 | 1.7 | 29.2 | 90 | 14 | M |
| H | 33 | 15.2 | 3.2 | 80 | 0.6 | 42 | 20 | 18 | M |
| I | 5 | 15.2 | 3.2 | 40 | 2.5 | 14 | 60 | 48 | M |
| J | 14 | — | — | 0 | 2.5 | 14 | 100 | 25 | M |

(Remarks)
*1 "Aver" is an abbreviation of "Average".
*2 "p.d." means "particle diameter".
*3 "S.s.a." means "Specific furnace area".
*4 "M" means "Molten".
*5 "M/C" means "Molten/Crystalline".

TABLE 2

| Composition | Examples | | | | | | Comparative Example | | | | | |
| --- | --- | --- | --- | --- | --- | --- | --- | --- | --- | --- | --- | --- |
| | 1 | 2 | 3 | 4 | 5 | 5 | 1 | 2 | 3 | 4 | 5 | 6 |
| o-Cresol Novolac epoxy resin (Epoxy equiv. 215) (Softening point 80° C.) | 15 | 15 | 15 | 15 | 15 | 15 | 15 | 15 | 15 | 15 | 15 | 15 |
| Phenol Novolac resin (OH equiv. 103) (Softening point 96° C.) | 7 | 7 | 7 | 7 | 7 | 7 | 7 | 7 | 7 | 7 | 7 | 7 |
| Brominated phenol Novolac resin (Epoxy equiv. 275) (Softening point 84° C.) | 3 | 3 | 3 | 3 | 3 | 3 | 3 | 3 | 3 | 3 | 3 | 3 |
| Antimony trioxide | 0.7 | 0.7 | 0.7 | 0.7 | 0.7 | 0.7 | 0.7 | 0.7 | 0.7 | 0.7 | 0.7 | 0.7 |
| Carnauba wax | 0.4 | 0.4 | 0.4 | 0.4 | 0.4 | 0.4 | 0.4 | 0.4 | 0.4 | 0.4 | 0.4 | 0.4 |
| Carbon black | 0.3 | 0.3 | 0.3 | 0.3 | 0.3 | 0.3 | 0.3 | 0.3 | 0.3 | 0.3 | 0.3 | 0.3 |
| Silane coupling agent | 0.6 | 0.6 | 0.6 | 0.6 | 0.6 | 0.6 | 0.6 | 0.6 | 0.6 | 0.6 | 0.6 | 0.6 |
| Curing accelerator of the general formula (e) | 1 | 1 | 1 | 0.9 | 0.7 | 1 | 1 | 1 | 1 | 1 | 1 | 1 |
| 2-Methylimidazole | — | — | — | 0.1 | — | — | — | — | — | — | — | — |
| Triphenylphosphine | — | — | — | — | 0.3 | — | — | — | — | — | — | — |
| Silica powder A | 72 | — | — | — | — | — | — | — | — | — | — | — |
| Silica powder B | — | 72 | — | — | — | — | — | — | — | — | — | — |
| Silica powder C | — | — | 72 | 72 | 72 | — | — | — | — | — | — | — |
| Silica powder D | — | — | — | — | — | 72 | — | — | — | — | — | — |
| Silica powder E | — | — | — | — | — | — | 72 | — | — | — | — | — |
| Silica powder F | — | — | — | — | — | — | — | 74 | — | — | — | — |
| Silica powder G | — | — | — | — | — | — | — | — | 76 | — | — | — |
| Silica powder H | — | — | — | — | — | — | — | — | — | 72 | — | — |
| Silica powder I | — | — | — | — | — | — | — | — | — | — | 70 | — |
| Silica powder J | — | — | — | — | — | — | — | — | — | — | — | 72 |
| Gel time at 100° C. (sec) | 1986 | 2524 | 2130 | 1485 | 1560 | 2018 | 1260 | 1200 | 1242 | 1826 | 2010 | 1080 |
| Spiral flow (cm) | 140 | 122 | 113 | 98 | 102 | 115 | 92 | 80 | 84 | 62 | 52 | 90 |
| Flux length (5μ) clearance (mm) | 2.1 | 1.5 | 1.0 | 0.5 | 0.5 | 1.8 | 4.5 | 3.2 | 3.0 | 2.2 | 1.0 | 5.7 |
| Gel time at 180° C. (sec) | 40 | 42 | 42 | 36 | 34 | 40 | 44 | 42 | 42 | 42 | 40 | 40 |

(Remarks)
The amount of each ingredient is shown in terms of gram (g).

It is understood that the preceding representative Examples may be varied within the scope of the present specification both as to ingredients and treating conditions, by those skilled in the art to achieve essentially the same results. As many widely different embodiments of this invention may be made without departing from the spirit and scope thereof, it is to be construed that this invention is not limited to the specific embodiments thereof except as defined in the appended claims.

What is claimed is:

1. An epoxy resin composition comprised of (1) an epoxy resin, (2) a curing agent, (3) a curing accelerator and (4) a silica powder, characterized in that the silica powder has (a) an average particle diameter of not more than 30 μm, (b) 5–30% by weight of a previously molten or crystalline silica powder having an average particle diameter of not more than 7 μm and a specific surface area of at least 5 m²/g in the total silica content, (c) 15–45% by weight of silica having an average particle diameter of not more than 5 μm in the total silica content, (d) the maximum particle diameter of the total silica content of not more than 150 μm, and (e) a silica content of 70–82% by weight in the total composition.

2. An epoxy resin composition according to claim 1, wherein the curing accelerator is a urea derivative of the general formula: Ar—NH—CO—NR$_2$ where Ar stands for a substituted or unsubstituted aryl group and R's may be the same or different and each stands for an alkyl group.

3. An epoxy resin composition wherein the curing accelerator is an alkylurea derivative of the following general formulas (a)–(f):

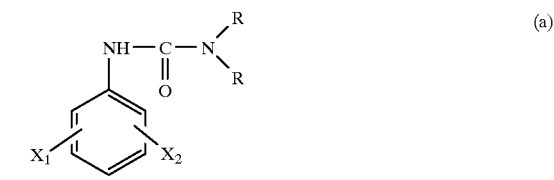

(a)

wherein $X_1$ and $X_2$ may be the same or different and each stannds for a hydrogen atom, a halogen atom, an alkyl group preferably with 1–5 carbon atoms, an alkoxy group preferably with 1–5 carbon atoms or a nitro group, and R's may be the same or different and each stands for an alkyl group preferably with 1–10 carbon atoms and more preferably with 1–5 carbon atoms.

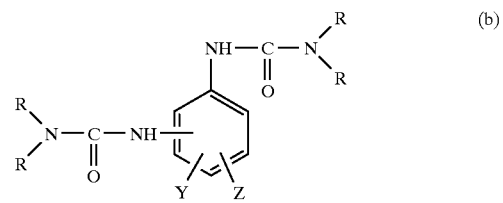

(b)

wherein Y and Z may be the same or differnt and each stands for a hydrogen atom, a halogen atom or an alkyl group preferably with 1–5 carbon atoms and R's may be the same or different and each stands for a lower alkyl group.

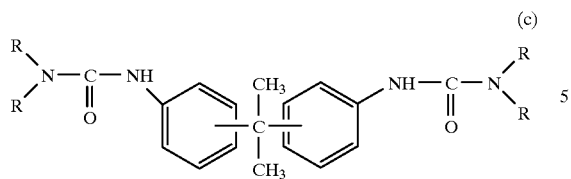
(c)

wherein R's may be the same or different and each stands for a lower alkyl group;

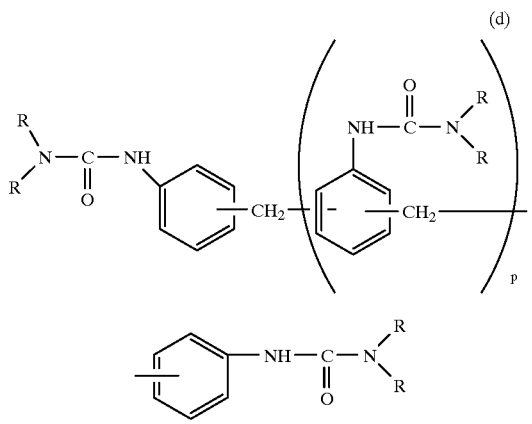
(d)

wherein P is an integer of 0–5 and R's may be the same or different and each stands for an alkyl group preferably with 1–10, more preferably with 1–5 carbon atoms.

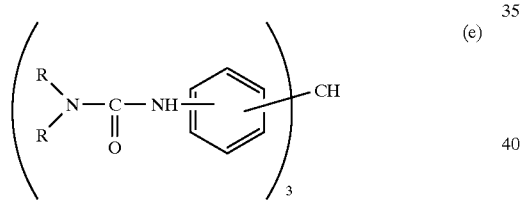
(e)

and

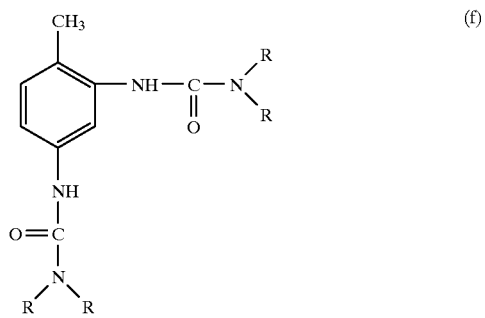
(f)

wherein R's may be the same or different and each stands for an alkyl group preferably with 1–10, more preferably with 1–5 carbon atoms.

4. An epoxy resin composition according to claim 1, wherein the curing accelerator is a dimethylamine adduct of 2,4-tolylenediisocyanate of the following formula:

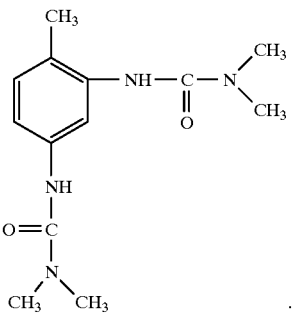

* * * * *